(12) United States Patent
Naruse et al.

(10) Patent No.: US 9,546,614 B2
(45) Date of Patent: Jan. 17, 2017

(54) FUEL PROPERTY DETECTION APPARATUS

(71) Applicant: DENSO CORPORATION, Kariya, Aichi-pref. (JP)

(72) Inventors: Hideo Naruse, Chiryu (JP); Makoto Mashida, Kariya (JP); Koji Ishizuka, Chita-gun (JP); Jun Kawamura, Chita-gun (JP); Masayuki Suzuki, Toyota (JP)

(73) Assignee: DENSO CORPORATION, Kariya (JP)

( * ) Notice: Subject to any disclaimer, the term of this patent is extended or adjusted under 35 U.S.C. 154(b) by 57 days.

(21) Appl. No.: 14/626,136

(22) Filed: Feb. 19, 2015

(65) Prior Publication Data

US 2015/0252745 A1 Sep. 10, 2015

(30) Foreign Application Priority Data

Mar. 7, 2014 (JP) ................................ 2014-044521

(51) Int. Cl.
*F02D 41/04* (2006.01)
*F02D 41/30* (2006.01)
*F02D 35/02* (2006.01)
*F02D 41/00* (2006.01)

(52) U.S. Cl.
CPC ............. *F02D 41/04* (2013.01); *F02D 35/028* (2013.01); *F02D 41/0025* (2013.01); *F02D 41/3005* (2013.01); *F02D 2200/0612* (2013.01); *Y02T 10/36* (2013.01)

(58) Field of Classification Search
CPC ........ F02D 35/02; F02D 35/028; F02D 41/00; F02D 41/0025; F02D 41/04; F02D 41/30; F02D 41/3005; F02D 2200/0612; Y02T 10/32; Y02T 10/36

USPC .......... 123/294–299, 1 A, 27 GE, 525, 575; 701/103, 104, 114; 73/114.08, 114.38, 73/114.42, 114.52, 114.53, 114.62, 114.74
See application file for complete search history.

(56) References Cited

U.S. PATENT DOCUMENTS

| 2004/0118116 A1* | 6/2004 | Beck .......................... F02B 1/12 60/601 |
| 2005/0188948 A1* | 9/2005 | Miura ................. F02D 41/0002 123/299 |
| 2006/0090727 A1* | 5/2006 | Weissman ................. C10L 1/06 123/295 |

(Continued)

FOREIGN PATENT DOCUMENTS

| JP | 2005-023856 | 1/2005 |
| JP | 2006-226188 | 8/2006 |

*Primary Examiner* — Hung Q Nguyen
*Assistant Examiner* — Johnny H Hoang
(74) *Attorney, Agent, or Firm* — Nixon & Vanderhye PC

(57) ABSTRACT

A fuel property detection apparatus detects fuel properties based on cetane number and density of a tested fuel. Tested fuel is examined in terms of ignition timing, and, when the tested fuel has an ignition timing earlier than a threshold, the tested fuel is identified as having a standard cetane number. When the tested fuel has an ignition timing later than the threshold, the tested fuel is identified as having a low cetane number. An advance angle of the ignition timing is increased for yielding a greater ignition timing difference between a light property fuel and a heavy property fuel, and, in such manner, the difference therebetween is detected. When an advancement of the ignition timing is greater than a threshold, the fuel property is identified as heavy, and, when an advancement of the ignition timing is smaller than the threshold, the fuel property is identified as light.

8 Claims, 6 Drawing Sheets

(56) References Cited

U.S. PATENT DOCUMENTS

2009/0145199 A1* 6/2009 Kuronita ............ G01N 33/2829
73/35.02
2009/0292445 A1* 11/2009 Schuckert ........... F02D 41/0025
701/103
2015/0159565 A1 6/2015 Suzuki et al.

* cited by examiner

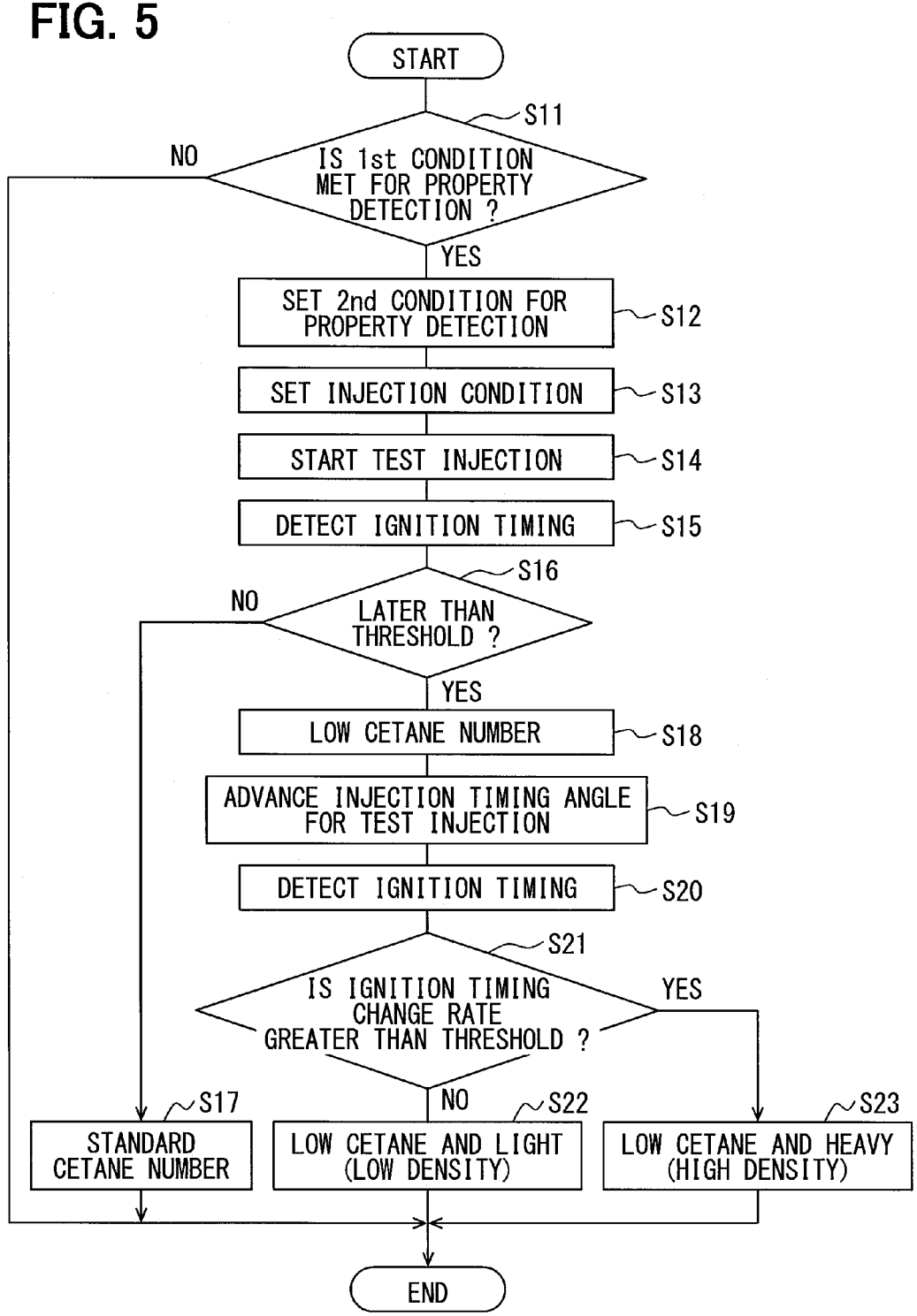

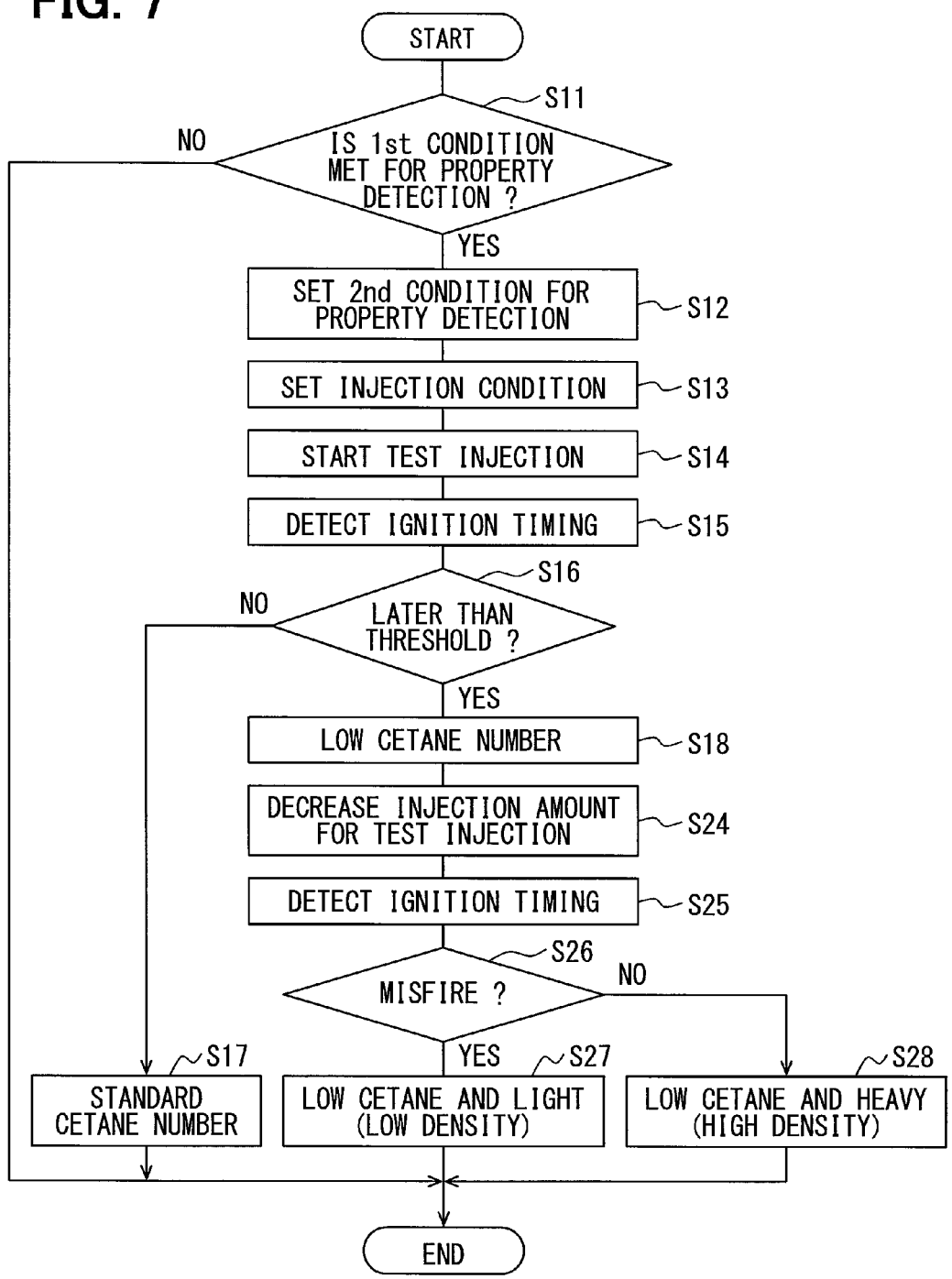

FUEL PROPERTY DETECTION APPARATUS

CROSS REFERENCE TO RELATED APPLICATION

The present application is based on and claims the benefit of priority of Japanese Patent Application No. 2014-044521, filed on Mar. 7, 2014, the disclosure of which is incorporated herein by reference.

TECHNICAL FIELD

The present disclosure generally relates to a fuel property detection apparatus that detects a fuel property of a fuel used in a compression ignition engine.

BACKGROUND INFORMATION

An invention for detecting a cetane number as a property of a fuel that is used in a compression ignition engine has been proposed in a patent document 1 (i.e., Japanese Patent Laid-Open No. 2009-144528). The invention in the patent document 1 detects a cetane number of a fuel based on a torque change amount that corresponds to a change of a fuel injection amount in one of many sub-injections performed after a main injection, which is designated as a specific injection.

However, the fuel property is not only determined by a cetane number but also by a density, which affects a state of the internal combustion. That is, even when the two kinds of fuel have the same cetane number, the density difference of the two fuels results in respectively different combustion states. Therefore, for the optimization of the combustion, the combustion control must take into account the density of the fuel in addition to the cetane value. For such purposes, detecting both of the cetane number and the density of the fuel is beneficial. Further, the fuel density may be detected by using a separate and dedicated fuel density sensor. However, a separate and dedicated fuel density sensor leads to an increase of the number of sensors.

SUMMARY

It is an object of the present disclosure to provide a fuel property detection apparatus that is capable of detecting both cetane number and density, without increasing the number of sensors, by distinguishing between fuels having the same cetane number and different densities.

In an aspect of the present disclosure, the fuel property detection apparatus is applied to an internal combustion engine that is configured to cause a compression self-ignition of a fuel that is injected by a fuel injection valve for injecting the fuel into a cylinder. The fuel property detection apparatus includes a condition setting section that sets a fuel injection condition that provides an ignitability difference between fuels having different cetane numbers and densities, an injection controller that controls the injection of a test fuel from the fuel injection valve according to the fuel injection condition set by the condition setting section for testing fuel property, an ignitability detector detecting ignitability of the test fuel, and a fuel property identification section identifying the fuel property of the test fuel based on a position of a detected ignitability of the test fuel, that is detected by the ignitability detector when the test fuel is injected from the fuel injection valve, on a two-dimensional map having a cetane number axis and a density axis.

Further, the condition setting section sets, as the injection condition, an injection timing having an advance angle that is advanced from a compression top dead center to a value that yields an ignition timing difference between fuels having a same cetane number and different densities. The injection controller injects the test fuel at the injection timing set by the condition setting section. The ignitability detector detects the ignitability of the fuel by detecting the ignition timing of the test fuel. The fuel property identification section identifies the fuel property based on the detected ignition timing detected by the ignitability detector.

Also, the condition setting section sets a threshold fuel injection amount as the injection condition, and the threshold fuel injection amount is an injection amount sufficient to determine whether two same-cetane number fuels having different densities ignite. The injection controller injects the test fuel by an amount that is set by the condition setting section. The ignitability detector detects the ignition of the test fuel as a ignitability thereof. The fuel property identification section identifies the fuel as having high density when the ignition of the test fuel is detected by the ignitability detector, and identifies the fuel as having low density when the ignition of the test fuel is not detected by the ignitability detector.

Even further, the condition setting section changes a setting of the injection amount of the test fuel toward a limit ignition amount that allows the ignition of the test fuel. The ignitability detector detects the limit injection amount of the test fuel based on a change of ignitability of the test fuel during a change of the injection amount by the condition setting section. The fuel property identification section identifies the fuel property based on the limit injection amount.

Moreover, the fuel property identification section identifies the fuel property of the fuel that is injected from the fuel injection valve, based on whether the position of the fuel in the two-dimensional map is within (A) a standard cetane number region, (B) a light property region that is on a low density side of the standard cetane number region and in a low cetane number region in which the fuel has a cetane number lower than the standard cetane number, or (C) a heavy property region that is on a high density side of the standard cetane number region and in the low cetane number region.

Yet further, the fuel property identification section includes a first identification unit identifying whether the fuel is positioned in the standard cetane number region or in the low cetane number region, and a second identification unit identifying whether the fuel is positioned in the light property region or in the heavy property region based on the ignitability of the fuel detected by the ignitability detector, when the fuel is determined to have a position in the low cetane number region by the first identification unit.

In another aspect of the present disclosure, the fuel property detection apparatus is applied to an internal combustion engine that is configured to cause a compression self-ignition of a fuel that is injected from a fuel injection valve for injecting the fuel into a cylinder. The fuel property detection apparatus includes a condition setting section that sets a fuel injection condition that provides an ignitability difference between fuels having different cetane numbers and densities, an injection controller that controls the injection of a test fuel from the fuel injection valve according to the fuel injection condition set by the condition setting section for testing fuel property, an ignitability detector detecting ignitability of the test fuel, and a fuel property identification section identifying the fuel property of the test fuel by comparing the detected ignitability of the test fuel that is detected by the ignitability detector when the test fuel is injected from the fuel injection valve to a relationship between cetane number and fuel density.

Also, the ignitability detector detects ignitability of the test fuel based on a detection value of an in-cylinder pressure sensor or a knock sensor.

According to the inventor's study, when two fuels have respectively different cetane numbers and densities, the ignitability difference is observed among the two fuels, due to the difference of the molecular structure of the two fuels which is emphasized in the combustion process of the fuel under a specific injection condition. Therefore, in the present disclosure, the test fuel is injected on the specific injection condition, for detecting the ignitability of the fuel. The detected ignitability reflects the density of the fuel as well as the cetane number. Based on the detected ignitability, the fuel property identification section identifies a position of the fuel in a two dimensional fuel property map, which has a cetane number axis and a density axis. In such manner, even when the two fuels have the same cetane number, the densities of the two fuels are detected, for the detection of both of the cetane number and the fuel density. Further, the fuel density is detected based on the ignitability, but not on the use of the dedicated sensor, thereby preventing the increase of the number of the sensors.

BRIEF DESCRIPTION OF THE DRAWINGS

Objects, features, and advantages of the present disclosure will become more apparent from the following detailed description made with reference to the accompanying drawings, in which:

FIG. 5 is a flowchart of a fuel property detection process in a first embodiment of the present disclosure;

FIG. 7 is a flowchart of a fuel property detection process in a second embodiment of the present disclosure.

DETAILED DESCRIPTION

First Embodiment

Figure 1:
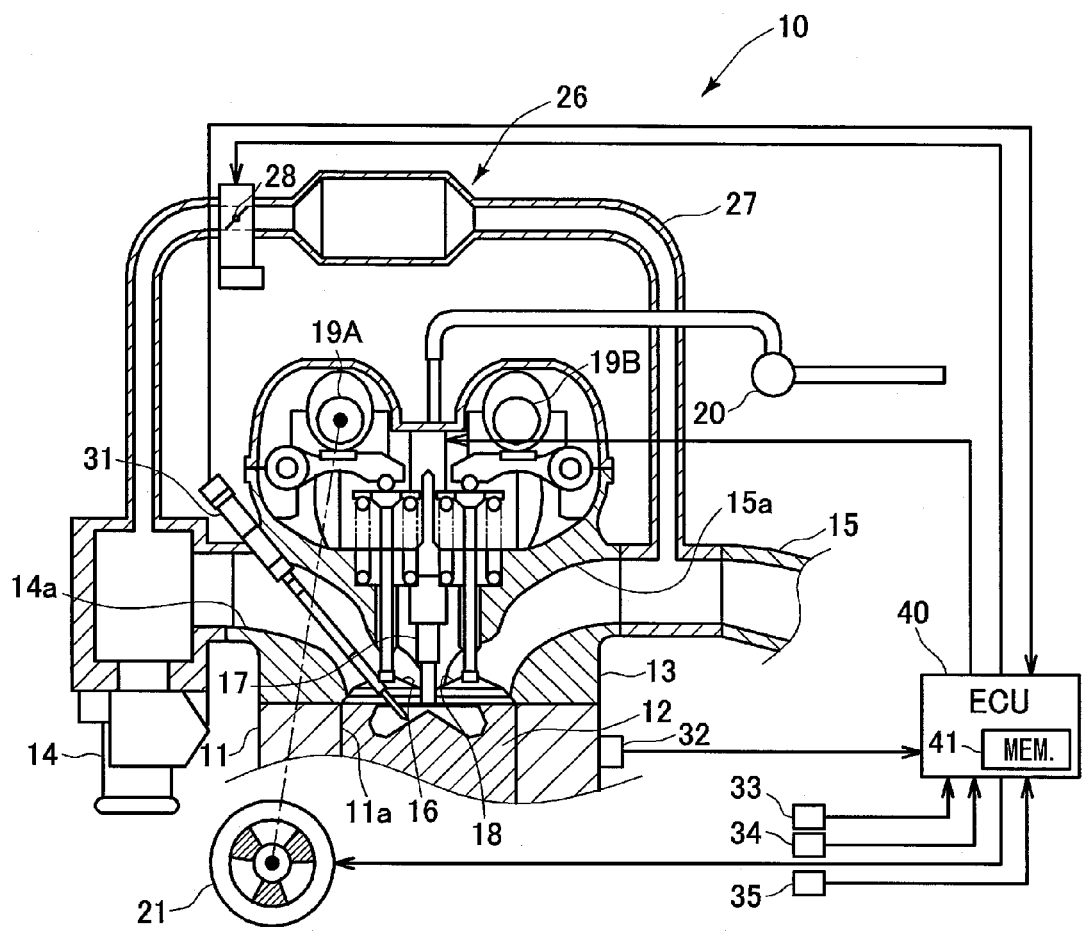
FIG. 1 is an illustration of a diesel engine and an ECU.

Hereafter, the first embodiment of the present disclosure is described, referring to the drawings. The present embodiment is applied to a diesel engine for a vehicle, and is realized as a control device (i.e., ECU) which controls the operation of the diesel engine.

First, the outline of a diesel engine 10 is described with reference to FIG. 1. The diesel engine 10 (i.e., a compression ignition type internal-combustion engine) has an inline 4-cylinder engine, for example, and only one of four cylinders is shown in the drawing. As illustrated in FIG. 1, the engine 10 is provided with a cylinder block 11, a piston 12, a cylinder head 13, an intake pipe 14, an exhaust pipe 15, an intake valve 16, an injector 17, an exhaust valve 18, a VVT 21, an EGR system 26, and the like.

Four cylinders 11*a* are provided in the cylinder block 11. The piston 12 is accommodated in each of the four cylinders 11*a*, respectively in a reciprocally-movable manner. The cylinder head 13 is attached to the cylinder block 11. The combustion chamber is structured by a cylinder 11*a*, the piston 12, and the cylinder head 13.

The intake pipe 14 is connected to the cylinder block 11. The intake pipe 14 is connected to each cylinder 11*a* via an intake manifold and an in-head pipe 14*a* that is included in the cylinder head 13. Cam shafts 19A and 19B are rotated by a rotation of a crankshaft (not illustration) of the engine 10.

Each of the intake valves 16 is driven by a rotation of the cam shaft 19A, and each in-head pipe 14*a* is opened and closed by the intake valve 16. The VVT 21 (i.e., Variable Valve Timing device) variably adjusts opening and closing timing of the intake valve 16 by an adjustment of the rotation phase between the crankshaft and the cam shaft 19A.

The exhaust pipe 15 is connected to the cylinder block 11. The exhaust pipe 15 is connected to each cylinder 11*a* via an exhaust manifold and an in-head pipe 15*a* in the cylinder head 13.

Each of the exhaust valves 18 is driven by a rotation of the cam shaft 19B, and each in-head pipe 15*a* is opened and closed by the exhaust valve 18.

Fuel (i.e., light oil) is pressure-supplied to a common rail 20 by a fuel pump (not illustration). The common rail 20 (i.e., a pressure accumulation container) holds fuel in a pressurized state. The injector 17 (i.e., a fuel injection valve) injects the fuel that is held in the pressurized state in the common rail 20 into the cylinder 11*a*.

The EGR system 26 (i.e., an Exhaust Gas Recirculation system) is provided with an EGR passage 27 and an EGR valve 28. The EGR passage 27 connects the exhaust pipe 15 and the intake pipe 14. The EGR valve 28 which opens and closes the EGR passage 27 is disposed in the EGR passage 27. The EGR system 26 introduces and mixes a part of the exhaust gas in the exhaust pipe 15 into the intake air in the intake pipe 14 according to the opening degree of the EGR valve 28.

In the intake stroke of the engine 10, air is sucked into the cylinder 11*a* through the intake pipe 14, and the air is compressed by the piston 12 in a compression stroke. The fuel is injected into the cylinder 11*a* by the injector 17 when the piston 12 reaches substantially to a compression top dead center of the cylinder 11*a*, and the injected fuel self-burns in a combustion stroke. In an exhaust stroke, the exhaust gas in the cylinder 11*a* is discharged through the exhaust pipe 15. A part of the exhaust gas in the exhaust pipe 15 is introduced into the intake air in the intake pipe 14 by the EGR system 26.

Various sensors required for the operation control of the engine 10 are disposed in the engine 10. Specifically, for example, the engine 10 has an in-cylinder pressure sensor for detecting an in-cylinder pressure of the cylinder 11*a*, a knock sensor 32 for detecting a knock, a rotation sensor 33 for detecting the number of rotations of the engine 10, and an accelerator pedal sensor 34 for detecting an accelerator pedal operation amount indicative of a requested torque requested from a driver of the vehicle.

The knock sensor 32 is directly attached to the cylinder block 11, for example, and can be used as a sensor which detects vibration of the cylinder block 11.

The rotation sensor 33 can be used as a sensor which detects a crank angle, for example.

Further, in the engine 10, temperature sensors for detecting the temperature of each of the engine 10 parts are provided, such as a water temperature sensor 35 which detects the temperature of the cooling water flowing in the cooling water pipe (i.e., a water jacket) provided in the cylinder block 11.

The ECU (Electric Control Unit) 40 is a microcomputer having a CPU, a memory 41 (ROM, RAM, storage device, etc.), an I/O interface, etc. The ECU 40 controls the injector 17, the VVT 21, and the EGR system 26 and the like based on the detection value of each of the above-mentioned sensors 31-35 or the like.

Specifically, the control states of the injector 17, the VVT 21, and the EGR system 26 are optimized in advance according to the operational status of the engine 10, and each of those devices is controlled to be in the optimized control state based on the detection value of various sensors.

Figure 2:
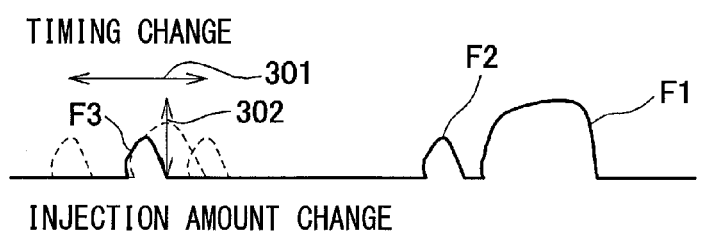
FIG. 2 is a diagram of a fuel injection timing and a fuel injection amount for injecting a fuel from a fuel injector.

The timing of the injection of fuel by the injector 17 and the amount of the injection are shown in FIG. 2. In FIG. 2, each of peaks F1 to F3 represents an injection of the fuel, and the position (i.e., a position in a horizontal direction) of each of the peaks F1 to F3 represents an injection timing, and the height of each of the peaks F1 to F3 represents an injection amount.

The ECU 40 performs a main injection F1 and an auxiliary injection F2 (i.e., a pilot injection, a pre injection) by the injector 17, as shown in FIG. 2. The main injection F1 is performed near a compression top dead center for obtaining the output (i.e., for a drive of the piston 12) of the engine 10.

The auxiliary injection F2 is performed at an earlier timing that is earlier than the main injection F1, for mixing the intake air and the fuel to have an air fuel mixture, or for decreasing noise, vibration, or NOx emission. Further, the ECU 40 is equivalent to a "detector" of the present disclosure, and performs a test injection F3 (i.e., an injection for detection) for detecting the fuel property of the used fuel separately from the main injection F1 and the auxiliary injection F2. The details of the test injection F3 for fuel property detection are mentioned later.

Figure 3:
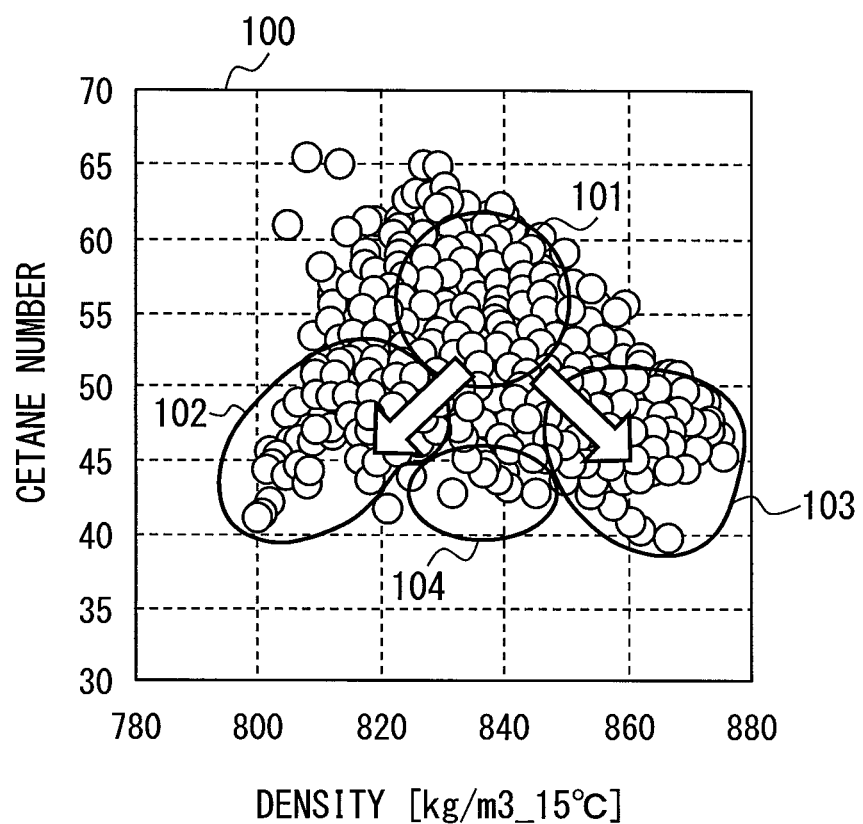
FIG. 3 is a fuel property map of various fuel types that are used by an engine.

FIG. 3 is a property distribution map showing distribution/diversity of the fuel for use by the engine 10.

In detail, the distribution map in FIG. 3 has a horizontal axis of density and a vertical axis of cetane number, for mapping a position of each of various fuels in a two-dimensional map 100. The fuel used by the engine 10 is mapped mainly in a region 101 that represents a JIS 2 type light oil, which is a classification according to JIS K2204 standard, together with a region 102 that represents a kerosene or a burning oil and a region 103 that represents a fuel oil. As the position approaches the kerosene region, the fuel has a lighter property containing a larger percentage of light property components, such as paraffin compound, etc., and the fuel has a heavier property containing a larger percentage of heavy property components, such as aromatic compounds, etc. as the position in the map approaches the fuel oil. That means, the larger the percentage of the light components, the lower the density of the fuel, and the larger the percentage of the heavy components, the higher the density of the fuel. Also, the closer the position is to the kerosene, the lower the cetane number, and the closer the position is to the fuel oil, the lower the cetane number.

That is, when the region 101 is designated as a standard cetane number region, the region 102 is designated as a light property region, and the region 103 is designated as a heavy property region, the light and heavy property regions 102, 103 have a lower cetane number than the standard cetane number region 101. Further, even though the cetane number is the same for the light property region 102 and the heavy property region 103, the density of the fuel in the light property region 102 is lower than the density of the fuel in the heavy property region 103. Further, an area between the light property region 102 and the heavy property region 103 is a region 104 in which only a few fuel types distributes.

As described above, the usable fuels distribute very widely on the two-dimensional map 100, and the combustion states of those fuels vary position to position in the map.

Specifically, for example, since the cetane number of the fuel in the standard cetane number region 101 is higher than the fuel in the regions having low cetane number, i.e., the fuels in the regions 102 and 103, such fuel has a good ignitability. In other words, the fuels in the low cetane number regions 102, 103 are poor in ignitability in comparison to the fuels in the standard cetane number region 101.

Further, the light property low cetane fuel in the light property region 102 has larger percentage of paraffin compounds as a light property component, and the paraffin compounds are chain compounds (i.e., acyclic compounds). The chain compounds are further categorized as no-branch compounds (i.e., linear-chain compounds) and branched compounds (i.e., compounds having chemical side chain). The light property low cetane fuel in the light property region 102 are mostly branched compounds. On the other hand, the heavy low cetane fuel in the heavy property region 103 has larger percentage of aromatic compounds as a heavy property component, and the molecular structure of the aromatic compounds is a ring. Therefore, compared with the standard fuel, the light property low cetane fuel has inferior reactivity due to the larger percentage of the branched compounds, thereby having a longer ignition delay. The heavy property low cetane fuel has inferior reactivity also due to the larger percentage of the ring structure compounds compared with the standard fuel, thereby also having a longer ignition delay. However, among the low cetane number fuels, the light property low cetane fuel is prone to misfire when injected by a small amount, since the light property low cetane fuel has good transpiration nature which causes a too-lean air fuel mixture at a small injection amount time, and, on the other hand, the heavy property low cetane fuel has a longer combustion period and tends to generate a smoke (soot), since the ring structure is difficult to resolve in the combustion. Therefore, even when the control regarding the injection amount of the fuel and the opening and closing timing of the intake valve 16 as well as the EGR amount (i.e., an exhaust recirculation amount) is performed according to the cetane number, such a control may not be able to appropriately control the combustion of the fuel.

Therefore, the ECU 40 performs a fuel property detection process, from which the used fuel is detected as to what position in those regions 101 to 103 on the two-dimensional map 100 the used fuel takes.

Figure 4:
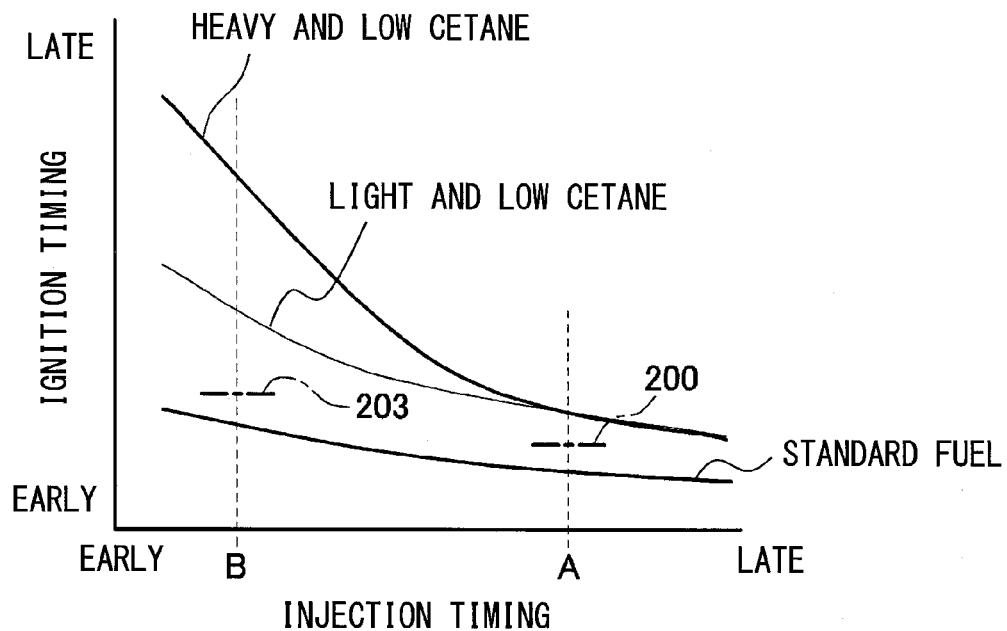
FIG. 4 is a diagram of a relationship between an injection timing and an ignition timing for a standard fuel, a light and low cetane fuel, and a heavy and low cetane fuel.

Here, FIG. 4 is a diagram explaining an idea of how to detect the fuel property in the present embodiment. Specifically, FIG. 4 illustrates a relationship between the fuel injection timing and the ignition timing of the injected fuel (i.e., an ignition delay time from the injection to the ignition) for those fuels, i.e., the standard fuel, the light property low cetane fuel, and the heavy property low cetane fuel.

As shown in FIG. 4, as for the ignition timing, the ignition timing becomes later, i.e., delays, or is retarded, as the injection timing becomes earlier, i.e., is advanced, for all of those fuels, i.e., for the standard fuel, the light property low cetane fuel, and the heavy property low cetane fuel. This is because the earlier the injection timing is, the piston departs farther away from the compression top dead center, which results in a lower temperature and a lower in-cylinder pressure and causes the lower ignitability of the fuel.

Further, when the standard fuel is compared with the low cetane fuel (i.e., the light property low cetane fuel, and the heavy property low cetane fuel), the low cetane fuel has a late ignition timing compared with the standard fuel. This is because, as mentioned above, the low cetane fuel has the cetane number lower than the standard fuel.

Further, when the light property low cetane fuel is compared with the heavy property low cetane fuel, while the injection timing is late, the difference of the ignition timing is small between the light property low cetane fuel and the heavy property low cetane fuel. This is because the fuel is injected into a high-temperature high-pressure cylinder when the injection timing is late, facilitating the chemical reaction between air and the heavy property low cetane fuel that has a larger percentage of the aromatic compounds that are hard to resolve, resulting in the same reaction speed as the light property low cetane fuel.

On the other hand, when the injection timing is early, the fuel is injected into a low-temperature low-pressure cylinder (i.e., into a hard to combust atmosphere), exaggerating the difference between the heavy property low cetane fuel and the light property low cetane fuel, in terms of the chemical reaction speed with the air, due to the difference of the molecular structure.

That is, in the atmosphere in which the light property low cetane fuel does not burn easily, the difference of reactivity between the ring structure and the light property component (i.e., the chain compounds) is clearly shown, thereby realizing a speedier chemical reaction of low-temperature oxidization, resulting in an earlier ignition timing. In other words, the heavy property low cetane fuel contains higher percentage of the heavy property components (i.e., the ring structure) which are hard to decompose, compared with the light property low cetane fuel equally having the low cetane number, causing a slower chemical reaction of low-temperature oxidation, and resulting in a later ignition timing.

Therefore, as shown in FIG. 4, the difference of the ignition timing between the heavy property low cetane fuel and the light property low cetane fuel becomes large, when the injection timing becomes early (i.e., is advanced).

The ECU 40 performs the fuel property detection process using the difference of the fuel property shown in FIG. 4 among the standard fuel, the light property low cetane fuel, and the heavy property low cetane fuel.

FIG. 5 is a flowchart of the fuel property detection process. The process in FIG. 5 is repeated at predetermined intervals by the ECU 40 (e.g., at every injection by the injector 17).

After a start of the process of FIG. 5, it is determined whether a first condition suitable for fuel property detection established in advance is first satisfied as an operating condition of the engine 10 (S11). Specifically, a stable operation condition which allows an operation of the engine 10 in a stable state (i.e., a state with little change of engine rotation number or engine load after a completion of warming up) is set as the first condition described above, for example.

Then, it is determined whether the stable operation condition is satisfied based on (i) whether the temperature of the cooling water detected with the water temperature sensor 35 is greater than a preset temperature, and (ii) whether the engine rotation number detected with the rotation sensor 33 is in a preset range, and (iii) whether the load of the engine 10 is in a preset range, for example. For the determination of whether the load of the engine 10 is within a preset range, a fuel injection amount instruction value may be used, which may be determined based on the engine rotation number and the detection value of the accelerator pedal sensor 34.

When the first condition is not satisfied (S11:No), the process of the flowchart in FIG. 5 is ended. In such a case, detection of the fuel property will not be performed in the present cycle of the process.

When the first condition is satisfied, the operation condition of the engine 10 is set to a second condition suitable for fuel property detection established in advance (S12).

More specifically, for example, when a test fuel injection is performed in S14, which is described later, the engine 10 is controlled under an operation condition that prevents the engine 10 from the influence of the test fuel injection, i.e., the operation condition that is set in order not to increase the soot from the engine 10 at the time of performing the test fuel injection. For example, an amount of intake air sucked into the cylinder 11a (i.e., an air intake amount) or a density of O2 (i.e., an oxygen density) are adjusted within a preset range that prevents the emission of the soot/smoke. In such case, the operation condition for realizing the air intake amount and the oxygen density described above is the second condition.

The intake air amount is adjusted by changing the opening and closing timing of the intake valve 16 by the VVT 21, for example. When bringing the closing timing of the intake valve 16 closer to an air intake bottom dead center by the VVT 21, the intake air amount is increased.

The O2 density is adjusted according to the change of the EGR amount by the EGR system 26, for example. When reducing the opening degree of the EGR valve 28, the EGR amount is decreased, thereby achieving an increase of the O2 density. Further, under a condition that does not perform the main injection and the auxiliary injection for a decrease of the smoke emission, the O2 density may also be decreased.

That is, as long as the operation of the engine 10 is not hindered, the second condition may flexibly be set for performing the fuel property detection.

Next, an injection condition of a test injection F3 (refer to FIG. 2) for detection, i.e., for testing the fuel property, is set (S13). Here, the injection condition for firstly identifying whether the used fuel is one of the standard fuel and the low cetane fuel is set. Specifically, an injection timing shown by "A" of FIG. 4 is set as an injection condition. Such an injection timing is a timing that produces only a small ignition timing difference between the light property low cetane fuel and the heavy property low cetane fuel, while producing a certain ignition timing difference between the standard fuel and the low cetane fuel (i.e., a later timing along the horizontal axis of FIG. 4). The injection timing set in S13 is any timing as long as the injection timing has a characteristic shown by the timing "A" of FIG. 4. The timing may be set, as shown in FIG. 2 as F3, as a timing earlier than an auxiliary injection F2, for example. In such manner, the test injection F3 is shifted from the timing of the main injection F1 and from the timing of the auxiliary injection F2, thereby enabling the detection of the fuel property by the test injection F3 to be performable with sufficient accuracy. Further, such a timing of the test injection F3 prevents a deterioration of the role of both of the main injection F1 and the auxiliary injection F2.

In addition, even though there is no limitation in particular from a viewpoint of fuel property detection about the fuel injection amount of the test injection F3 as long as the fuel injection amount is an ignitable amount, the fuel injection amount may (preferably) be set to a small amount, so that the role of the main injection F1 and the auxiliary injection F2 is not spoiled/deteriorated. The ECU 40 which performs a process in S13 is equivalent to a "condition setting section" of the present disclosure.

Next, the test injection F3 is started at S14 with the injector 17 by the injection condition (i.e., the injection timing, and the injection amount) set in S13.

The ECU 40 which performs a process of S14 is equivalent to an "injection controller" of the present disclosure.

Next, based on a detection value of the in-cylinder pressure sensor 31, an ignition timing of the fuel injected by the test injection F3 is detected at S15. Specifically, it is detected as a period of time from the start of the test injection F3 in S14 to the rise of the in-cylinder pressure by the combustion of fuel is detected by the in-cylinder pressure sensor 31.

Since the vibration state of the cylinder block 11 changes before and after the ignition, the ignition timing (i.e., ignitability) may also be detected based on the detection value of the knock sensor 32 (i.e., based on the vibration of the cylinder block 11). The ECU 40 which performs a process of S15 is equivalent to an "ignitability detector" of the present disclosure.

Next, the ignition timing detected in S15 is determined whether it is later than a threshold value established in advance at S16. The threshold value is set as a position between a position of a line 200 in FIG. 4, i.e., between a characteristic line of the standard fuel and a characteristic line of the low cetane fuel (i.e., the light property low cetane fuel, and the heavy property low cetane fuel) in FIG. 4.

At S17, when the ignition timing is earlier than the threshold value (S16:No), the used fuel is identified as the fuel in the standard cetane number region 101 (i.e., the standard fuel) of FIG. 3. Then, the process of the flowchart of FIG. 5 is ended.

On the other hand, when the ignition timing is later than the threshold value (S16:Yes), at S18, the used fuel is identified as the low cetane fuel in the light property region 102 or in the heavy property region 103 of FIG. 3.

Next, at S19, the injection timing of the test injection F3 started in S14 is advanced from the timing at the start time of the test injection F3. That is, in S19, the injection timing is re-set to the one having an advanced angle relative to the start time angle of the test injection F3 set in S14, and the test injection F3 is performed by the re-set injection timing.

Change (i.e., an advanced angle) of the injection timing in S19 is shown in FIG. 2 by an arrow 301 "TIMING CHANGE". How much advancement is appropriate is determined, for example, in view of a situation in FIG. 4 at a timing "B", where the ignition timing difference is widened between the light property low cetane fuel and the heavy property low cetane fuel.

Specifically, angle advancement is performed to a timing that has both of the temperature and the pressure in the cylinder 11a are sufficiently low, so that the influence of the reaction speed due to the molecular structure of the fuel appears in a notable manner. The injection timing (i.e., the injection timing of "B" in FIG. 4) after the angle advancement is an injection timing which has an advanced angle from the compression top dead center to such an extent that causes an ignition timing difference between the light property low cetane fuel and the heavy property low cetane fuel.

The ECU 40 which performs a process of S19 is equivalent to a "condition setting section" and an "injection controller" of the present disclosure.

Next, at S20, the ignition timing of the fuel injected by the test injection F3 after the angle advancement of the injection timing is detected by the same method as S15. The ECU 40 which performs a process of S20 is equivalent to the "ignitability detector" of the present disclosure.

Next, at S21, the change rate between the ignition timing detected in S15 and the ignition timing detected in S19 is computed. The change rate is a quotient of a difference between the ignition timing detected in S15 and the ignition timing detected in S19 by the advanced angle in S19 (i.e., an angle difference between A and B in FIG. 4). Then, it is determined whether the computed change rate is greater than the threshold value established in advance at S21. That is, in S21, with reference to an inclination of the line which represents a change of the ignition timing against the injection timing, whether the inclination is steeper than a threshold value is determined.

Further, in S21, instead of using the change rate of the ignition timing, whether an amount of change of the ignition timing before and after the angle advancement of S19 is greater than a threshold value may be determined, or whether an absolute value of the ignition timing after the angle advancement of S19 (i.e., the ignition timing of "B" in FIG. 4) is greater than a threshold value may be determined.

As shown in FIG. 4, the change rate, the amount of change, or the absolute value of the ignition timing of the heavy property low cetane fuel is greater than that of the light property low cetane fuel.

Therefore, when the change rate, the amount of change, or the absolute value of the ignition timing is greater than a threshold value (S21:Yes), the used fuel is identified as the heavy property low cetane fuel in the heavy property region 103 of FIG. 3 (S23). Then, the process of the flowchart of FIG. 5 is ended.

On the other hand, when the change rate, the amount of change, or the absolute value of the ignition timing is smaller than a threshold value (S21:No), the used fuel is identified as the light property low cetane fuel in the light property region 102 of FIG. 3 (S22). Then, the process of the flowchart of FIG. 5 is ended.

The ECU 40 which performs a process of S16-S18, and S21-S23 is equivalent to a "fuel property identification section" of the present disclosure.

The ECU 40 which performs a process of S16-S18 is equivalent to a "first identification unit" of the present disclosure.

The ECU 40 which performs a process of S21-S23 is equivalent to a "second identification unit" of the present disclosure.

After identifying the fuel property of the used fuel by the process of FIG. 5, the ECU 40 performs a combustion control according to the identified fuel property. Specifically, when the used fuel is the standard fuel, the ECU 40 controls an injection amount of the fuel by the injector 17, the opening and closing timing of the intake valve 16 by the VVT 21, and the opening degree of the EGR valve (i.e., the EGR amount) by the EGR system 26, to achieve an optimized control state that is set in advance.

Further, when the used fuel is the heavy property low cetane fuel, the EGR amount is decreased by the EGR system 26, to increase the O2 density in the cylinder 11a, for example. Since oxidization of the fuel is promoted in such manner, the ignition timing of the fuel is advanced by such control of the EGR amount. Therefore, due to the move of the position of igniting fuel moved toward an inside of the combustion chamber, the center of gravity of the combustion is moved toward an inside of the combustion chamber, resulting in a prevention of cooling loss. Further, generation of a smoke is reduced by burning and oxidizing the fuel before polymerization of a heavy component of the fuel.

Further, when the used fuel is the light property low cetane fuel, for example, the opening and closing timing of the intake valve 16 is changed by the WT 21, for an increase of the compression ratio at the time of compressing the intake air (gas) in the cylinder 11a, or for an increase of the injection amount of pilot injection (i.e., the auxiliary injection F2 of FIG. 2). When the compression ratio of the intake air in the cylinder 11a is increased, an excessive diffusion/dispersion of the injected fuel before ignition is prevented for a stable combustion and for an improved ignitability. Further, by decreasing the before-ignition attach amount of the spray fuel onto the wall of the combustion chamber, the cooling loss and/or an HC generation is prevented. Further, by increasing the injection amount of the pilot injection performed by the injector 17, the temperature in the cylinder 11a is raised while stabilizing the combustion by the pilot injection. As a result, the combustion by the main injection following the pilot injection is stabilized.

According to the present embodiment, as described above, while identifying the cetane number of the used fuel with a process in S16 of FIG. 5, when the fuel is identified as having a low cetane number light, the fuel is further identified as having a light property or having a heavy property by a process after S18. Therefore, an optimal combustion control according to the fuel property of the used fuel is performed. Further, the light/heavy property of the fuel is identified without using a fuel density sensor for detecting the density of the fuel, thereby reducing the number of sensors. Further, the injection condition of the test injection is set in two steps, i.e., in S13 and in S19, for firstly determining whether the fuel is a standard fuel or a low cetane fuel, and, based on an identification that the fuel is a low cetane fuel, the fuel is further identified as having the light property or the heavy property. Therefore, the identification of those fuel properties is accurately performed.

Second Embodiment

Next, the second embodiment of the present disclosure is described focusing on a different portion from the above-mentioned embodiment. The configuration of the present embodiment is the same as that of FIG. 1.

The fuel property detection process which ECU 40 performs differs from the first embodiment.

Figure 6:
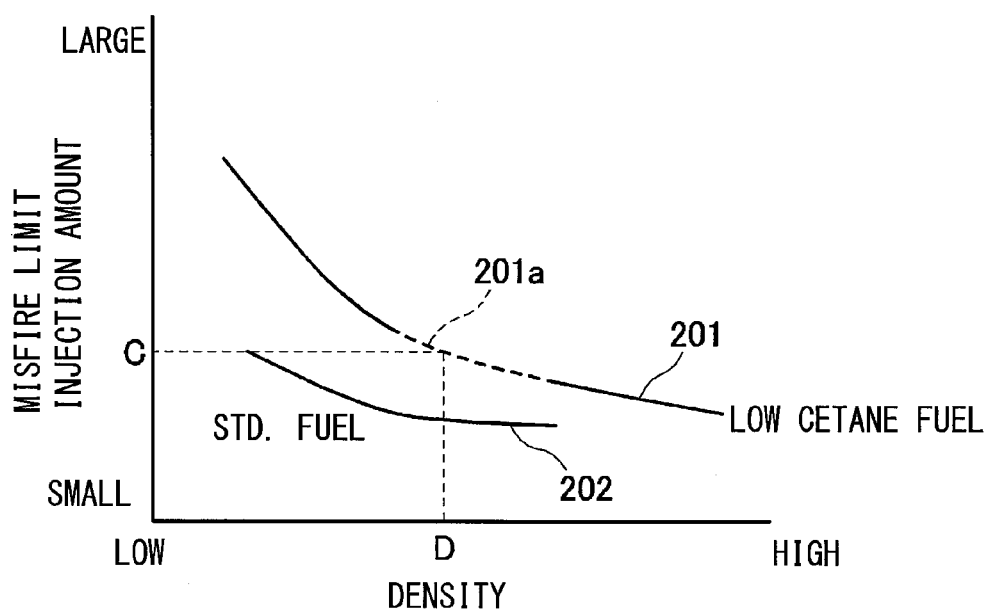
FIG. 6 is a diagram of a relationship between a fuel density and a misfire limit injection amount for the standard fuel and the low cetane fuel.

Here, FIG. 6 illustrates an idea of how to detect the fuel property in the present embodiment. Specifically, FIG. 6 is a diagram of relationship between the fuel density and the injection amount to show a limit amount at which the fuel property is classified as whether to ignite or not (i.e., a misfire limit injection amount), for the standard fuel having a standard cetane number, and for the low cetane fuel having a low cetane number.

In FIG. 6, a line 201 shows a misfire limit injection amount of the low cetane fuel, and a line 202 shows a misfire limit injection amount of the standard fuel. Further, the misfire limit injection amount is equivalent to a boundary injection amount that defines a boundary between a misfire injection amount region and an ignitable injection amount region. The low cetane fuel ignites when injected by an amount above the line 201, and does not ignite (i.e., misfires) when injected by an amount below the line 201. The standard fuel ignites when injected by an amount above the line 202, and does not ignite (i.e., misfires) when injected by an amount below the line 202.

As shown in FIG. 6, compared with the standard fuel, the misfire limit injection amount of the low cetane fuel is greater. This is because the low cetane fuel has a low cetane number compared with the standard fuel and ignitability is poor. Further, for both of the low cetane fuel and the standard fuel, the misfire limit injection amount is greater for the lower density. This is because the low density light property fuel has a low boiling point and high transpiration nature. When transpiration nature is high, the injection timing is early (i.e., the in-cylinder temperature and the in-cylinder pressure are low), thereby causing a too-lean atmosphere (i.e., too-much air mixture) due to the transpiration of the spray fuel, and thus easily misfires as a result. The line 201 of FIG. 6 has a high density side and a low density side connected by a dotted line 201a, which corresponds to the region 104 of FIG. 3, and means that there is no such fuel as low cetane fuel having a medium density (i.e., the density close to the standard fuel).

Since the standard cetane number region 101 of FIG. 3 does not extends to the high density side (i.e., does not have the density of the heavy property region 103), the line 202 of FIG. 6 does not extend toward the high density side.

While the ECU 40 identifies whether the used fuel is the standard fuel or the low cetane fuel in a manner just like the first embodiment, the ECU 40 identifies whether the fuel is the light property low cetane fuel or the heavy property low cetane fuel by using the characteristic shown by the line 201 of FIG. 6.

FIG. 7 is a flowchart of the fuel property detection process in the present embodiment. In FIG. 7, the same numeral is given to the same process as the process of FIG. 5.

In FIG. 7, it is first determined, just like the first embodiment, whether the ignition timing of the test injection F3 (refer to FIG. 2) is later than a threshold value (S11-S16). However, the injection timing in the test injection F3 performed in S13 and S14 is set to a timing that causes misfire of the light property fuel in the fuel-amount decreased injection in S24 mentioned later, which is because of the low in-cylinder pressure and temperature in the cylinder 11a (i.e., an early timing earlier than the auxiliary injection F2 of FIG. 2).

In S16, when the ignition timing is earlier than a threshold value (S16:No), the used fuel is identified as the standard fuel at S17, and when the timing is late (S16:Yes), the used fuel is identified as the low cetane fuel at S18.

When the used fuel is identified as the low cetane fuel, then, the fuel injection amount which is set as an injection amount in the test injection F3 in S13 is decreased therefrom at S24, i.e., from the injection amount in S13, with the injection timing kept unchanged from S13.

That is, in S24, the injection amount decreased from the amount set in S13 is re-set (as a setting for a current injection), and such a re-set injection amount is used to perform the test injection F3. Such a situation of the change of an injection amount in S24 is shown in FIG. 2 by an arrow 302 of "INJECTION AMOUNT CHANGE".

The amount the injection amount should be decreased is determined based on the following consideration. That is, for the light property low cetane fuel, the after-decrease injection amount should reach the misfire limit injection amount, and, for the heavy property low cetane fuel, the after-decrease injection amount should not reach the misfire limit injection amount. Specifically, the injection amount of the test injection F3 is decreased so that the after-decrease injection amount may be positioned as a misfire limit injection amount C (henceforth designated as a threshold injection amount C) located in the "region" of, or "on", the line 201*a* of FIG. 6, for example.

In such case, for the light property low cetane fuel on a low density side than the threshold injection amount C (i.e., the fuel having the density lower than a density D), the misfire limit injection amount is greater than the threshold injection amount C, thereby causing a misfire (i.e., the fuel is not ignitable).

On the other hand, from density D, for the heavy property low cetane fuel on a high density side, the misfire limit injection amount is smaller than the threshold injection amount C, thereby not causing a misfire (i.e., the fuel is ignitable).

Further, the ECU 40 which performs a process of S24 is equivalent to a "condition setting section" and an "injection controller" of the present disclosure.

Then, the ignition timing of the fuel injected by the test injection F3 after a decrease of the injection amount is detected (i.e., the detection of the timing is attempted) based on the detection value of the in-cylinder pressure sensor 31 or the knock sensor 32 (S25). The ECU 40 which performs a process of S25 is equivalent to the "ignitability detector" of the present disclosure.

Then, based on the detection result of the ignition timing in S25, it is determined whether the combustion by the test injection F3 of S24 is a misfire (S26). Specifically, it is determined that the combustion is a misfire when the detection result of S25 indicates that the detection of the ignition timing is NOT complete (i.e., the ignition timing was NOT detected), and that the combustion is NOT a misfire when the detection result of S25 indicates that the detection of the ignition timing is complete (i.e., the ignition timing was detected).

In other words, S25 is an attempt of detection of a misfire, and S26 is a determination of whether a misfire detection is complete.

When a misfire is detected and determined in S26 (S26: Yes), the used fuel is identified as the light property low cetane fuel (S27).

On the other hand, when no misfire is detected in S26 (S26:No), the used fuel is identified as the heavy property low cetane fuel (S28).

A process of the flowchart of FIG. 7 is ended after S27 and S28. Then, the ECU 40 performs a combustion control according to the identified fuel property, just like the first embodiment. Thus, in the present embodiment, the same effect as the first embodiment is achieved.

The ECU 40 which performs a process of S26-S28 is equivalent to a "fuel property identification section" of the present disclosure, and a "second identification unit."

Third Embodiment

The third embodiment of the present disclosure is described in the following focusing on a difference from the above-mentioned embodiments. The present embodiment is an embodiment positioned as a modification of the second embodiment. That is, in the second embodiment, when the used fuel is the low cetane fuel, the fuel is further identified as the light property low cetane fuel or the heavy property low cetane fuel is identified using the characteristic of FIG. 6. In the present embodiment, the density itself of the used fuel is identified using the characteristic of FIG. 6.

Figure 8:
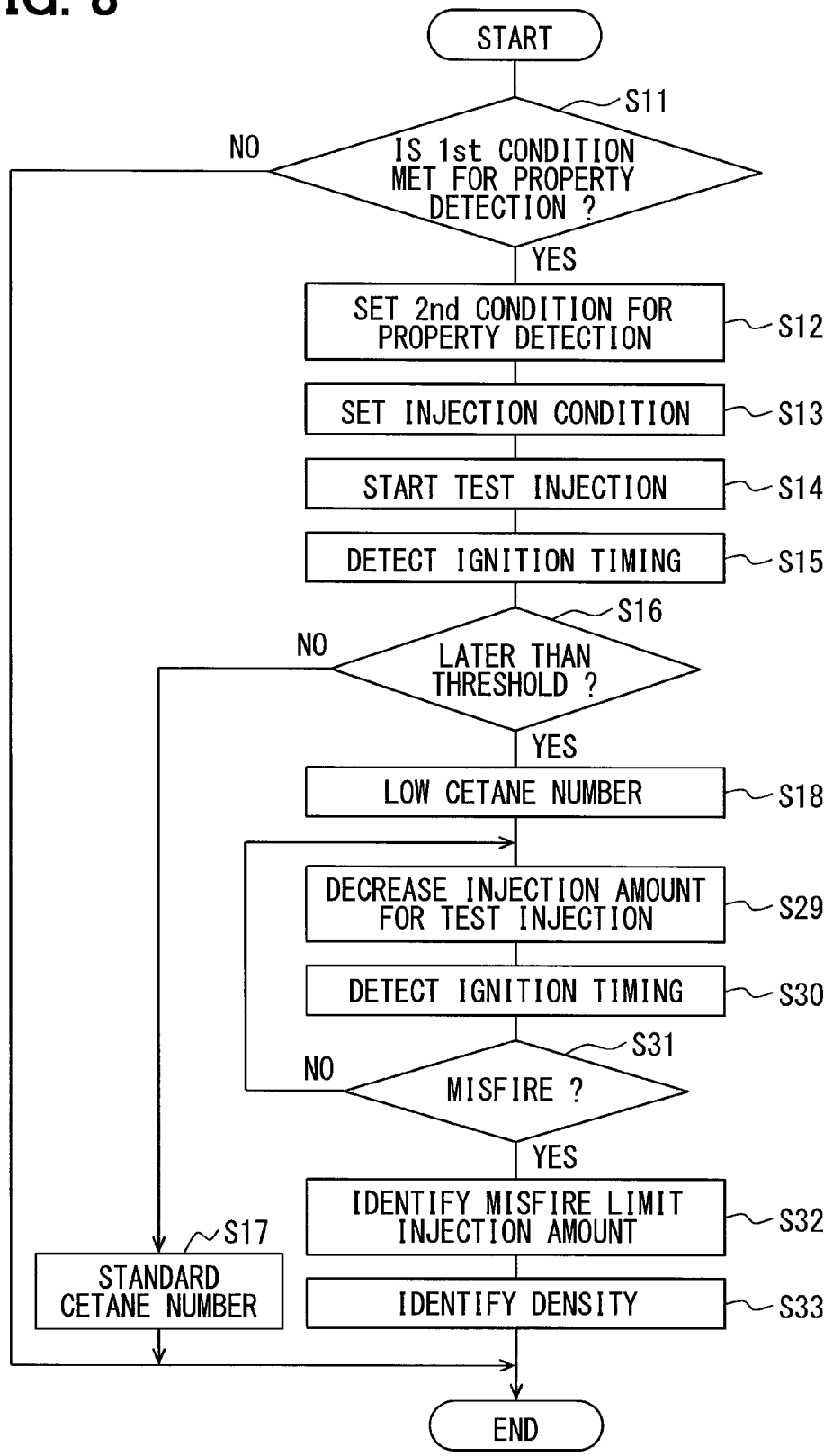
FIG. 8 is a flowchart of a fuel property detection process in a third embodiment of the present disclosure.

Here, FIG. 8 is a flowchart of the fuel property detection process which the ECU 40 in the present embodiment performs. In FIG. 8, same numerals are given to the same processes as a process of FIG. 7.

In the process of FIG. 8, S11-S18 are the same as in the process of FIG. 7, and a process of S29 and after differ from the process of FIG. 7.

That is, the used fuel is identified either as the standard fuel or as the low cetane fuel by the same method as the above-mentioned embodiment in the first place (S11-S18).

When the fuel is identified as the low cetane fuel, the injection amount in the test injection F3 is decreased from the injection amount set in S13, with the injection timing unchanged from S13, just like S24 in FIG. 7 (S29).

That is, in S29, the injection amount decreased from the injection amount set in S13 is re-set, and the re-set injection amount is used to perform the test injection F3.

However, in S29, the injection amount is gradually decreased, i.e., bit by bit, until the decreased and re-set injection amount causes a misfire, which is a different scheme from the second embodiment, i.e., from S24. Such a decrease of the injection amount is intended for identifying a misfire limit injection amount of the used fuel.

Therefore, in S29 in the present process cycle, only a minute decrease, which is predetermined, is caused in the injection amount.

The ECU 40 which performs a process of S29 is equivalent to a "condition setting section" of the present disclosure, and an "injection controller."

Next, a detection of the ignition timing of the fuel injected by the test injection F3 after a decrease of the injection amount is attempted, based on the detection value of the in-cylinder pressure sensor 31 or the knock sensor 32 (S30).

Next, based on the detection result of the ignition timing of S30, it is determined whether the combustion by the test injection F3 of S29 is a misfire (S31). When it is not a misfire (S31:No), the process returns to S29, and only a minute decrease which is predetermined is further decreased from the injection amount in the test injection F3. Thus, the injection amount in the test injection F3 decreases gradually until a misfire is detected in S31.

When a misfire is detected in S31 (S31:Yes), the newest injection amount adjusted in S29 is identified as a misfire limit injection amount of the used fuel (S32). The ECU 40 which performs process of S30-S32 is equivalent to an "ignitability detector" of the present disclosure.

Next, based on the characteristic shown by the misfire limit injection amount identified in S32 and by the line 201 of FIG. 6, the density of the used fuel is identified (i.e., whether the fuel has a light property or a heavy property) (S33). For such purposes, the characteristic shown by the line 201 of FIG. 6 is determined by the experiment in advance, and the determined characteristic is stored in a memory 41 (refer to FIG. 1). The process of the flowchart of FIG. 8 is ended after S33.

The ECU 40 which performs a process of S33 is equivalent to a "fuel property identification section" of the present disclosure, and a "second identification unit."

As described above, when the used fuel is identified as having the low cetane number, the density itself of the used fuel is identified in the present embodiment. Therefore, based on the identified cetane number and density, the combustion control is more accurately performed.

The present disclosure is not limited to the above, and various changes and modifications are within the scope.

For example, in S13 of FIG. 7, although the test injection is performed by the injection timing of "A" of FIG. 4, the test injection may be performed by the injection timing of "B." In such case, the threshold value in S16 is set as the position on the line 203 of FIG. 4. Even in such manner, the fuel is identified, whether it is the standard fuel or the low cetane fuel.

Further, when the injection timing of "B" is used, the ignition timing difference between the light property low cetane fuel and the heavy property low cetane fuel is large/wide. Therefore, a process in S18 of FIG. 7 and after may determine whether the fuel is the light property low cetane fuel or the heavy property low cetane fuel by taking into consideration the ignition timing detected in S15 in addition to the determination of whether the misfire is caused by the decrease of the injection amount in S24-S26. In such manner, the identification accuracy of the light property low cetane fuel or the heavy property low cetane fuel is improved.

Further, in the above-mentioned embodiment, the fuel is identified either as the standard fuel or the low cetane fuel in S16 of FIGS. 5, 7, 8, based on the earliness or lateness of the ignition timing. That is, whether the cetane number is high or low is determined in the above-described manner. However, the same determination may also be performed based on the characteristic in FIG. 6. Specifically, as shown by the lines 201 and 202 of FIG. 6, the higher the cetane number is, the smaller the misfire limit injection amount is. Thus, the misfire limit injection amount of the used fuel is calculated in the same manner as S29-S32 of FIG. 8, whether the calculated misfire limit injection amount is lower or higher than a threshold value. Then, if the calculated amount is higher than the threshold value, the fuel is identified as a low cetane fuel, and, if the calculated amount is lower than the threshold value, the fuel is identified as the standard fuel.

Further, the used fuel is identified as one of the standard fuel, the light property low cetane fuel, or the heavy property low cetane fuel. That is, the fuel is identified as belonging to one of the three regions 101, 102, or 103 in FIG. 3. However, the three regions 101 to 103 may further be divided into sub-regions, and the fuel may be identified as belonging to one of those sub-regions.

Specifically, for example, two regions, i.e., the low and high density regions, are defined in FIG. 3 in a category of the low cetane region, density may be divided into three regions. In such case, the ignition timing of "B" in FIG. 4 becomes late, as the density becomes high (i.e., as the heavy component increases). Thus, in FIG. 5 of S21, respectively different plural thresholds are set. Then, based on the ignition timing that is detected in S20, as to what position the detected ignition timing does, i.e., what is the change rate, the change amount, or the absolute value, as to an in-between position of which thresholds, the density of the low cetane fuel may be identified more finely. In such manner, the fuel property (i.e., a cetane number, density) of the used fuel is more accurately detected.

Further, in a process of S29 in FIG. 8 and after, the injection amount of the test fuel is gradually decreased from a large amount toward a small amount to identify the misfire limit injection amount, based on a detection of the ignition to misfire change. Conversely, the injection amount of the test injection may be increased from a small amount toward a large amount to perform the same identification, based on a detection of the misfire to ignition change.

Although the present disclosure has been fully described in connection with preferred embodiment thereof with reference to the accompanying figures, it is to be noted that various changes and modifications will become apparent to those skilled in the art, and such changes, modifications, and summarized schemes are to be understood as being within the scope of the present disclosure as defined by appended claims.

What is claimed is:

1. A fuel property detection apparatus applied to an internal combustion engine that is configured to cause a compression self-ignition of a fuel that is injected into a cylinder by a fuel injection valve, the fuel property detection apparatus comprising:
   a controller, including a processor and memory, the controller being at least configured to perform:
      a condition setting that sets a fuel injection condition for testing fuel property of fuel in a test injection;
      an injection control that controls the injection of the fuel in the test injection from the fuel injection valve according to the fuel injection condition set by the condition setting for testing fuel property;
      an ignitability detection that detects ignitability of the fuel in the test injection; and
      a fuel property identification that identifies the fuel property of the fuel in the test injection based on a position of a detected ignitability of the fuel in the test injection, that is detected by the ignitability detection when the fuel in the test injection is injected from the fuel injection valve, on a two-dimensional map having a cetane number axis and a density axis.

2. The fuel property detection apparatus of claim 1, wherein
   the condition setting sets, as the injection condition, an injection timing having an advance angle that is advanced from a compression top dead center to a value that yields an ignition timing difference between fuels having a same cetane number and different densities,
   the injection control injects the fuel in the test injection at the injection timing set by the condition setting,
   the ignitability detection detects the ignitability of the fuel in the test injection by detecting a detected ignition timing of the fuel in the test injection, and
   the fuel property identification identifies the fuel property based on the detected ignition timing detected by the ignitability detection.

3. The fuel property detection apparatus of claim 1, wherein
   the condition setting sets a threshold fuel injection amount as the injection condition, and the threshold fuel injection amount is an injection amount sufficient to determine whether two same-cetane number fuels having different densities ignite,
   the injection control injects the fuel in the test injection by an amount that is set by the condition setting,
   the ignitability detection detects the ignition of the fuel in the test injection for ignitability, and
   the fuel property identification identifies the fuel as having high density when the ignition of the fuel in the test injection is detected by the ignitability detection, and identifies the fuel as having low density when the ignition of the fuel in the test injection is not detected by the ignitability detection.

4. The fuel property detection apparatus of claim 1, wherein
   the condition setting changes a setting of the injection amount of the fuel in the test injection toward a limit ignition amount that allows the ignition of the fuel in the test injection, the ignitability detection detects the limit injection amount of the fuel in the test injection based on a change of ignitability of the fuel in the test injection during a change of the injection amount by the condition setting, and the fuel property identification identifies the fuel property based on the limit injection amount.

5. The fuel property detection apparatus of claim 1, wherein the fuel property identification identifies the fuel property of the fuel that is injected from the fuel injection valve, based on whether the position of the fuel in the two-dimensional map is within (A) a standard cetane number region, (B) a light property region that is on a low density side of the standard cetane number region and in a low cetane number region in which the fuel has a cetane number lower than the standard cetane number, or (C) a heavy property region that is on a high density side of the standard cetane number region and in the low cetane number region.

6. The fuel property detection apparatus of claim 5, wherein the fuel property identification includes:

a first identification that identifies whether the fuel is positioned in the standard cetane number region or in the low cetane number region; and a second identification that identifies whether the fuel is positioned in the light property region or in the heavy property region based on the ignitability of the fuel detected by the ignitability detection, when the fuel is determined to have a position in the low cetane number region by the first identification.

7. The fuel property detection apparatus of claim 1, wherein the ignitability detection detects ignitability of the fuel in the test based on a detection value of a pressure sensor or a knock sensor.

8. A fuel property detection apparatus applied to an internal combustion engine that is configured to cause a compression self-ignition of a fuel that is injected into a cylinder by a fuel injection valve, the fuel property detection apparatus comprising:

a controller, including a processor and memory, the controller being at least configured to perform:

a condition setting that sets a fuel injection condition for testing fuel property of fuel in a test injection;

an injection control that controls the injection of the fuel in the test injection from the fuel injection valve according to the fuel injection condition set by the condition setting for testing fuel property;

an ignitability detection detecting ignitability of the fuel in the test injection; and a fuel property identification identifying the fuel property of the fuel in the test injection by comparing the detected ignitability of the fuel in the test injection that is detected by a ignitability detection when the fuel in the test injection is injected from the fuel injection valve to a relationship between cetane number and fuel density.

\* \* \* \* \*